United States Patent
Krinke

(10) Patent No.: US 10,216,583 B1
(45) Date of Patent: Feb. 26, 2019

(54) SYSTEMS AND METHODS FOR DATA PROTECTION USING CLOUD-BASED SNAPSHOTS

(71) Applicant: Veritas Technologies LLC, Mountain View, CA (US)

(72) Inventor: Thomas Krinke, Forest Lake, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 132 days.

(21) Appl. No.: 15/367,217

(22) Filed: Dec. 2, 2016

(51) Int. Cl.
*G06F 11/00* (2006.01)
*G06F 11/14* (2006.01)
*G06F 17/30* (2006.01)

(52) U.S. Cl.
CPC ...... *G06F 11/1451* (2013.01); *G06F 11/1464* (2013.01); *G06F 11/1469* (2013.01); *G06F 17/30088* (2013.01); *G06F 17/30212* (2013.01); *G06F 2201/805* (2013.01); *G06F 2201/84* (2013.01)

(58) Field of Classification Search
CPC ............ G06F 11/1451; G06F 11/1464; G06F 11/1469; G06F 11/1402; G06F 11/1448; G06F 11/1453; G06F 11/1458; G06F 11/1471; G06F 17/30088; G06F 17/30212; G06F 2201/805; G06F 2201/84
See application file for complete search history.

(56) References Cited

U.S. PATENT DOCUMENTS

| | | | |
|---|---|---|---|
| 8,359,491 B1 * | 1/2013 | Bloomstein | G06F 11/1662 714/6.3 |
| 9,892,123 B2 * | 2/2018 | Kottomtharayil | G06F 17/30088 |
| 2010/0179959 A1 * | 7/2010 | Shoens | G06F 17/30088 707/758 |
| 2011/0087874 A1 * | 4/2011 | Timashev | G06F 9/44589 713/100 |
| 2017/0357550 A1 * | 12/2017 | Jain | G06F 11/1451 |

OTHER PUBLICATIONS

AWS; https://aws.amazon.com/backup-recovery/?hp=tile, as accessed Dec. 7, 2016; (May 26, 2015).
OpenStack; https://www.openstack.org/, as accessed Dec. 7, 2016; (Jul. 24, 2002).

* cited by examiner

*Primary Examiner* — Joseph D Manoskey
(74) *Attorney, Agent, or Firm* — FisherBroyles LLP

(57) ABSTRACT

The disclosed computer-implemented method for data protection using cloud-based snapshots may include (1) identifying a request to back up an information asset hosted by a cloud-based platform, (2) discovering, in response to the request, a plurality of snapshots taken at the cloud-based platform, where at least some of the plurality of snapshots store data underlying the information asset but do not provide a consistent image of the information asset, (3) determining that a snapshot subset of the plurality of snapshots provides data sufficient to produce a consistent image of the information asset by attempting to recover a consistent image of the information asset from the snapshot subset within a rehearsal environment, and (4) performing a backup that provides a consistent image of the information asset from the snapshot subset. Various other methods, systems, and computer-readable media are also disclosed.

20 Claims, 4 Drawing Sheets

SYSTEMS AND METHODS FOR DATA PROTECTION USING CLOUD-BASED SNAPSHOTS

BACKGROUND

In the digital age, organizations increasingly rely on information technology to store data and provide internal and external services. As the information technology needs of organizations have become increasingly complex, many organizations have turned to third parties to provide computing infrastructure as a service. These "cloud-computing" providers may provide flexibility and scalability to help organizations meet changing needs while managing costs.

Organizations may employ data protection systems to protect against data loss and service interruptions, both to ensure the smooth functioning of organizational operations and to meet increasingly burdensome regulatory requirements that mandate the availability of record systems. The increasingly elaborate information infrastructures employed by organizations (and facilitated by cloud-computing providers) correspond with increased complexity and uncertainty in data protection operations. Cloud-computing providers may provide primitive data protection services for organizations; however, these services may be application unaware and may therefore fail to protect data in a recoverable form, potentially leaving organizations exposed to data loss, service interruptions, and regulatory violations. Furthermore, organizations may be reluctant to entangle data protection systems too deeply with their production applications, whether due to performance concerns or ongoing administrative burdens. Thus, some organizations may simply gamble that they will face no significant data loss events or regulatory audits.

The instant disclosure, therefore, identifies and addresses a need for systems and methods for data protection using cloud-based snapshots.

SUMMARY

As will be described in greater detail below, the instant disclosure describes various systems and methods for data protection using cloud-based snapshots by identifying candidate snapshots (e.g., generated by and for restoring data on a cloud computing platform) from which an information asset may be recovered and systematically attempting to recover the information asset from the various candidate snapshots (e.g., within an isolated recovery environment on the cloud computing platform) until one or more snapshots are found to include data sufficient to produce a recoverable instance of the information asset. These systems and methods may then generate a backup (e.g., that may be platform-independent, as opposed to platform-dependent snapshots) from the suitable snapshots.

In one example, a computer-implemented method for data protection using cloud-based snapshots may include (i) identifying a request to back up an information asset hosted by a cloud-based platform, (ii) discovering, in response to the request, a group of snapshots taken at the cloud-based platform, where at least some of the snapshots store data underlying the information asset but do not provide a consistent image of the information asset, (iii) determining that a snapshot subset of the snapshots provides data sufficient to produce a consistent image of the information asset by attempting to recover a consistent image of the information asset from the snapshot subset within a rehearsal environment, and (iv) performing a backup that provides a consistent image of the information asset from the snapshot subset based on a successful attempt to recover the consistent image of the information asset from the snapshot subset within the rehearsal environment.

In one embodiment, the snapshots may preserve data in a storage arrangement specific to the cloud-based platform.

In one embodiment, the rehearsal environment may use the storage arrangement specific to the cloud-based platform.

In one embodiment, the computer-implemented method may further include (i) provisioning the rehearsal environment within the cloud-based platform to be isolated from a production environment within the cloud-based platform in which the information asset is in use and (ii) deploying an agent to the rehearsal environment to perform the backup of the information asset from within the rehearsal environment.

In one embodiment, at least some of the snapshots store data underlying the information asset but do not provide a consistent image of the information asset at least in part because the snapshots store data according to a view from a different level of a technology stack than a view from a level of the technology stack used by the information asset.

In one embodiment, the computer-implemented method may further include determining that a candidate snapshot within the snapshots does not provide data sufficient to produce a consistent image of the information asset and deleting the candidate snapshot at least in part in response to determining that the candidate snapshot does not provide data sufficient to produce a consistent image of the information asset.

In one embodiment, the computer-implemented method may further include deleting at least one snapshot within the snapshots but outside the snapshot subset based at least in part on determining that the snapshot subset provides data sufficient to produce a consistent image of the information asset.

In one embodiment, the information asset may include an application. In one embodiment, the information asset may include a file system and/or a virtual machine.

In one embodiment, the computer-implemented method may further include identifying a loss of availability of the information asset due to a failure at the cloud-based platform and recovering the information asset onto a different platform from the backup in response to identifying the loss of availability of the information asset due to the failure at the cloud-based platform.

In one embodiment, the subset of snapshots may be of a format consumable by the cloud-based platform but not by the different platform and the backup is of a format consumable by the different platform.

In one embodiment, a system for implementing the above-described method may include (i) an identification module, stored in memory, that identifies a request to back up an information asset hosted by a cloud-based platform, (ii) a discovery module, stored in memory, that discovers, in response to the request, a group of snapshots taken at the cloud-based platform, where at least some of the snapshots store data underlying the information asset but do not provide a consistent image of the information asset, (iii) a determination module, stored in memory, that determines that a snapshot subset of the snapshots provides data sufficient to produce a consistent image of the information asset by attempting to recover a consistent image of the information asset from the snapshot subset within a rehearsal environment, (iv) a performance module, stored in memory, that performs a backup that provides a consistent image of the information asset from the snapshot subset based on a successful attempt to recover the consistent image of the information asset from the snapshot subset within the rehearsal environment, and (v) at least one physical processor configured to execute the identification module, the discovery module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a request to back up an information asset hosted by a cloud-based platform, (ii) discover, in response to the request, a group of snapshots taken at the cloud-based platform, where at least some of the snapshots store data underlying the information asset but do not provide a consistent image of the information asset, (iii) determine that a snapshot subset of the snapshots provides data sufficient to produce a consistent image of the information asset by attempting to recover a consistent image of the information asset from the snapshot subset within a rehearsal environment, and (iv) perform a backup that provides a consistent image of the information asset from the snapshot subset based on a successful attempt to recover the consistent image of the information asset from the snapshot subset within the rehearsal environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
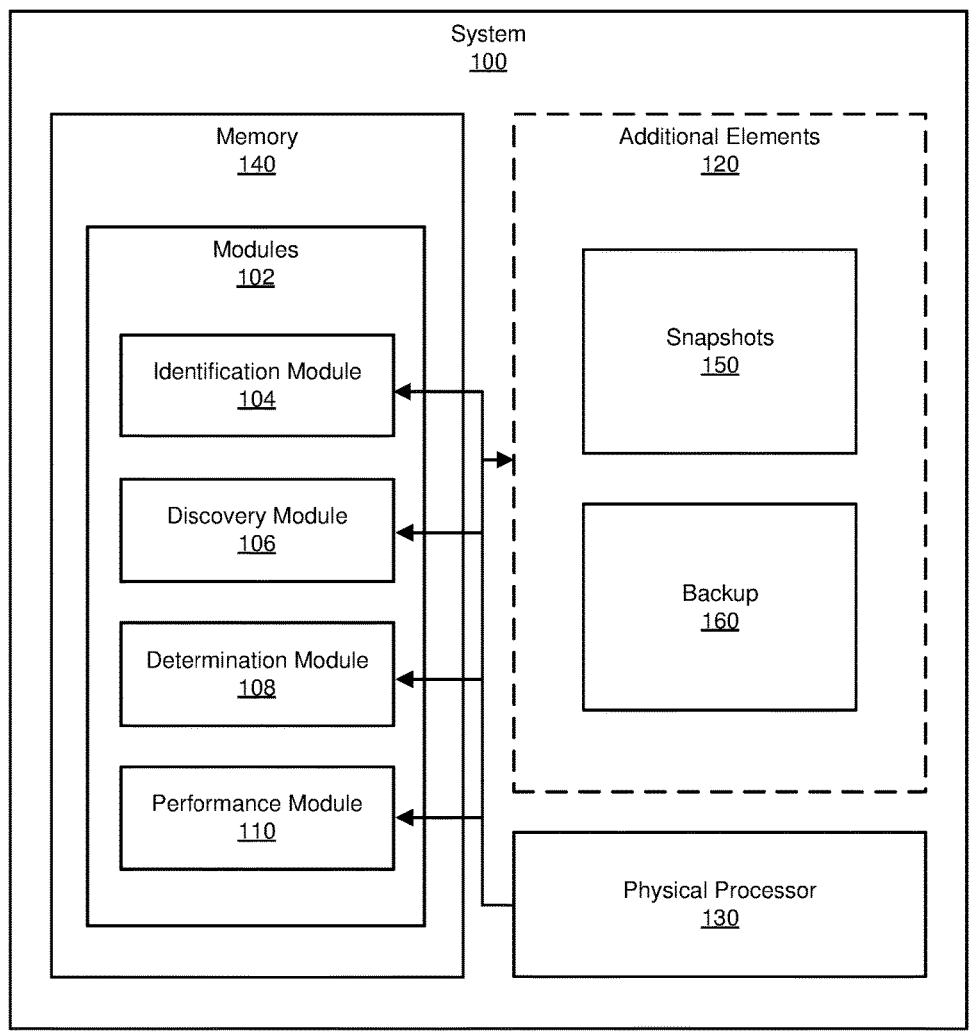
FIG. 1 is a block diagram of an example system for data protection using cloud-based snapshots.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for data protection using cloud-based snapshots. As will be explained in greater detail below, by identifying candidate snapshots (e.g., generated by and for restoring data on a cloud computing platform) from which an information asset may be recovered and systematically attempting to recover the information asset from the various candidate snapshots (e.g., within an isolated recovery environment on the cloud computing platform) until one or more snapshots are found to include data sufficient to produce a recoverable instance of the information asset, these systems and methods may enable the generation of a consistent and recoverable backup (e.g., that may be platform-independent, as opposed to platform-dependent snapshots) of the information asset from the suitable snapshots. These systems and methods may thus leverage existing cloud-based snapshot services to provide more reliable and/or useful data protect objects. In addition, in some examples, backups generated by these systems may ensure the protection of data that is consistent from the view and/or at the level of an information asset (e.g., thereby ensuring that the information asset is recoverable). In some examples, these systems may produce a backup that is platform independent (e.g., allowing recovery to a non-identical platform) and/or selectively identify and/or preserve snapshots useful for producing such a backup. Thus, these systems and methods may allow data administrators to achieve operational continuity in the case of a data loss event and increased confidence in meeting regulatory requirements (e.g., by ensuring that complex data-access systems can successfully be restored in case of an audit). In addition, these systems and methods may allow consumers of cloud-computing services to avoid placing backup agents within virtual machines on the cloud-computing platform (where such placements could potentially adversely impact the performance, stability, and/or administrative simplicity of cloud-computing services).

By generating, from cloud-platform-based snapshots, portable backups useable not only for preserving raw data but for restoring information assets (including, e.g., complex site-wide data systems potentially involving multiple applications) that enable meaningful access to protected data, the systems and methods described herein may improve the functioning of a computing device in various ways. For example, the systems and methods may improve the functioning of one or more computing devices at a recovery site by enabling the computing devices at the recovery site to correctly recover and/or access a backed up information asset. In another example, these systems and methods may improve the functioning of one or more computing devices at cloud-computing platform hosting the information asset by protecting the information asset hosted by the cloud-computing platform. In an additional example, these systems and methods may improve the functioning of one or more computing devices that host a production environment that makes use of the information asset by protecting data handled within the production environment without negatively impacting the performance of the production environment. In some examples, these systems and methods may improve the functioning of a cloud-computing platform (and/or one or more particular computing devices within the cloud-computing platform) by deleting redundant and/or useless snapshots (e.g., that are not needed for and/or capable of enabling a recoverable backup of the information asset) and thereby freeing storage space for additional snapshots and/or other data.

Figure 2:
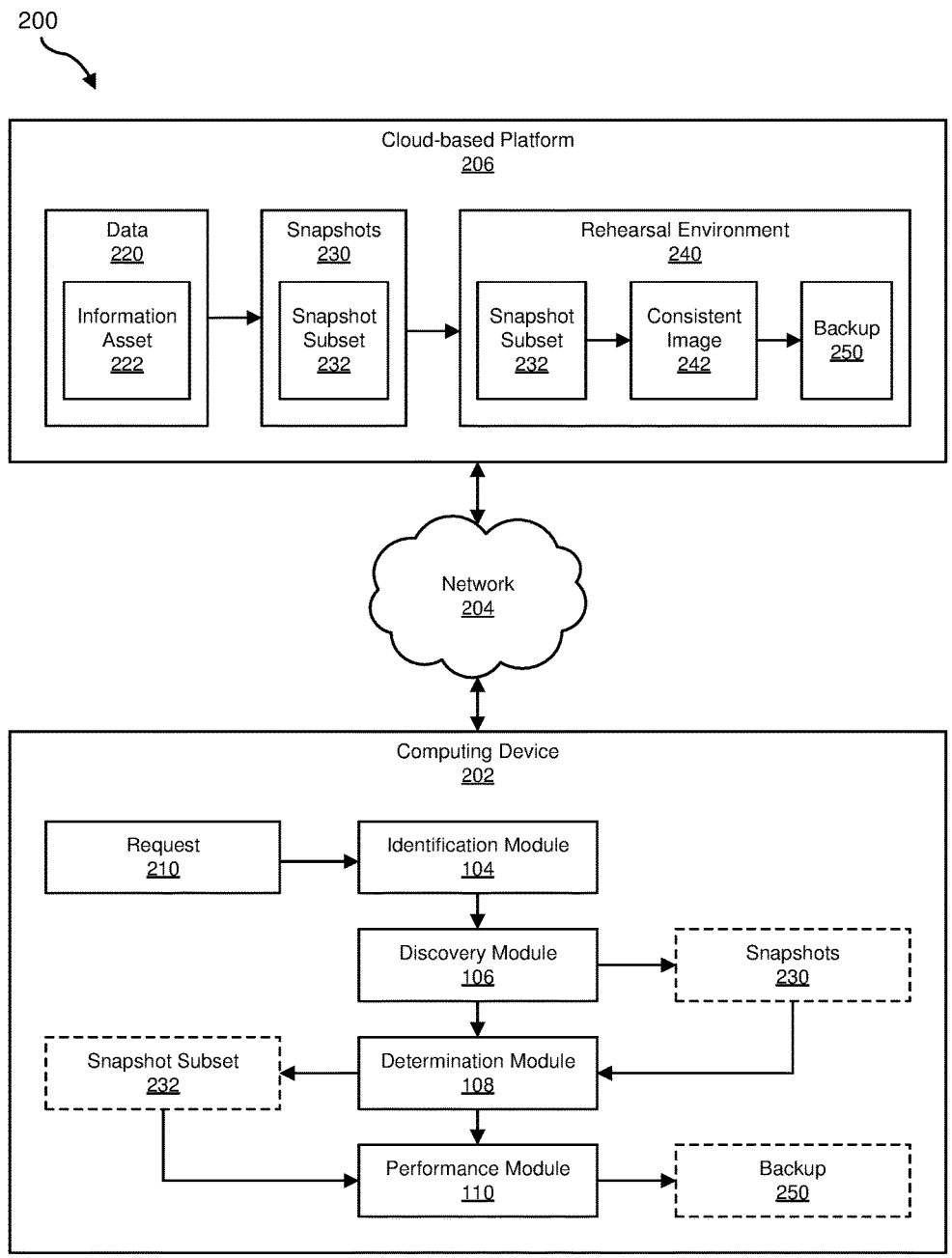
FIG. 2 is a block diagram of an additional example system for data protection using cloud-based snapshots.
Figure 3:
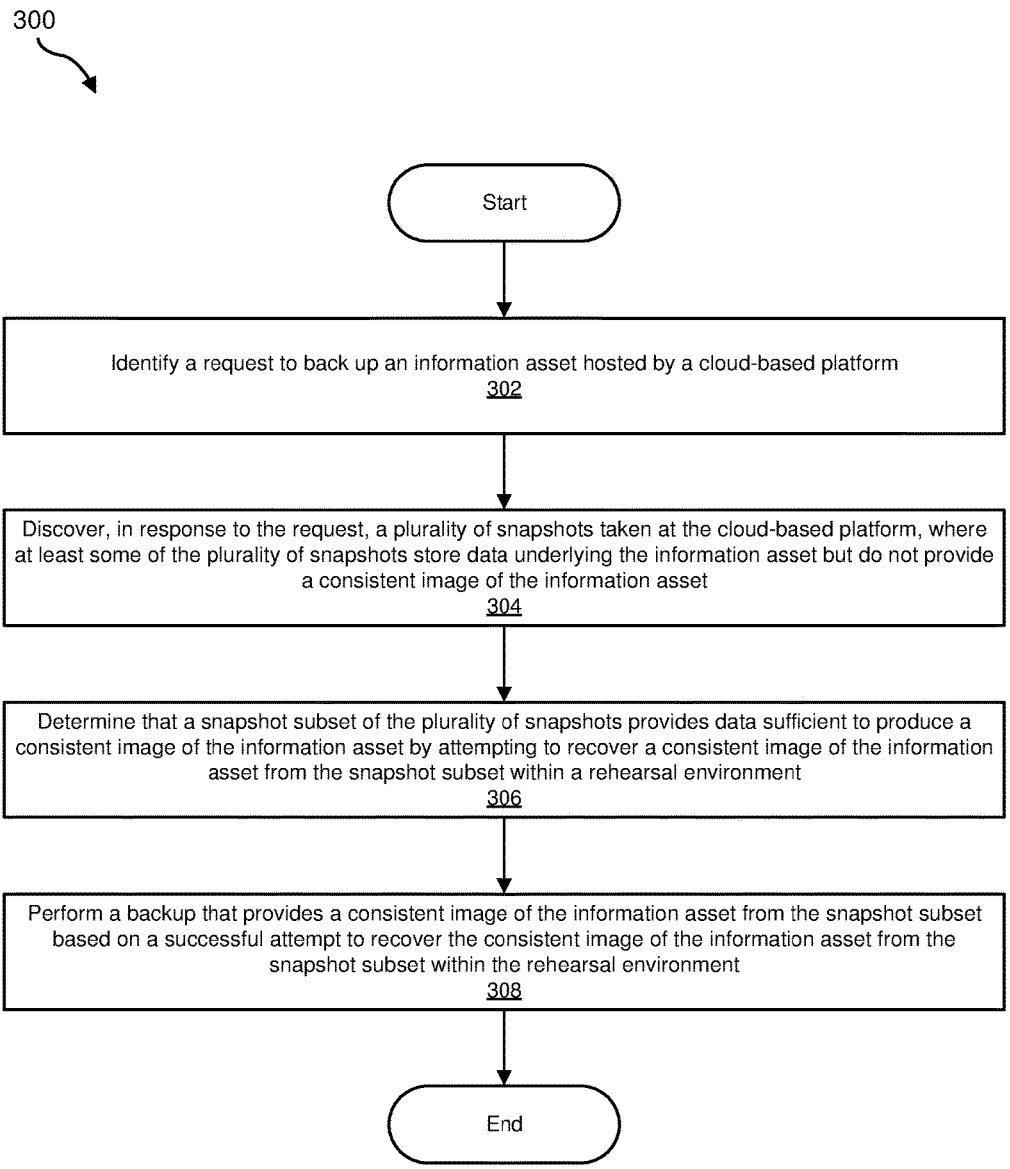
FIG. 3 is a flow diagram of an example method for data protection using cloud-based snapshots.
Figure 4:
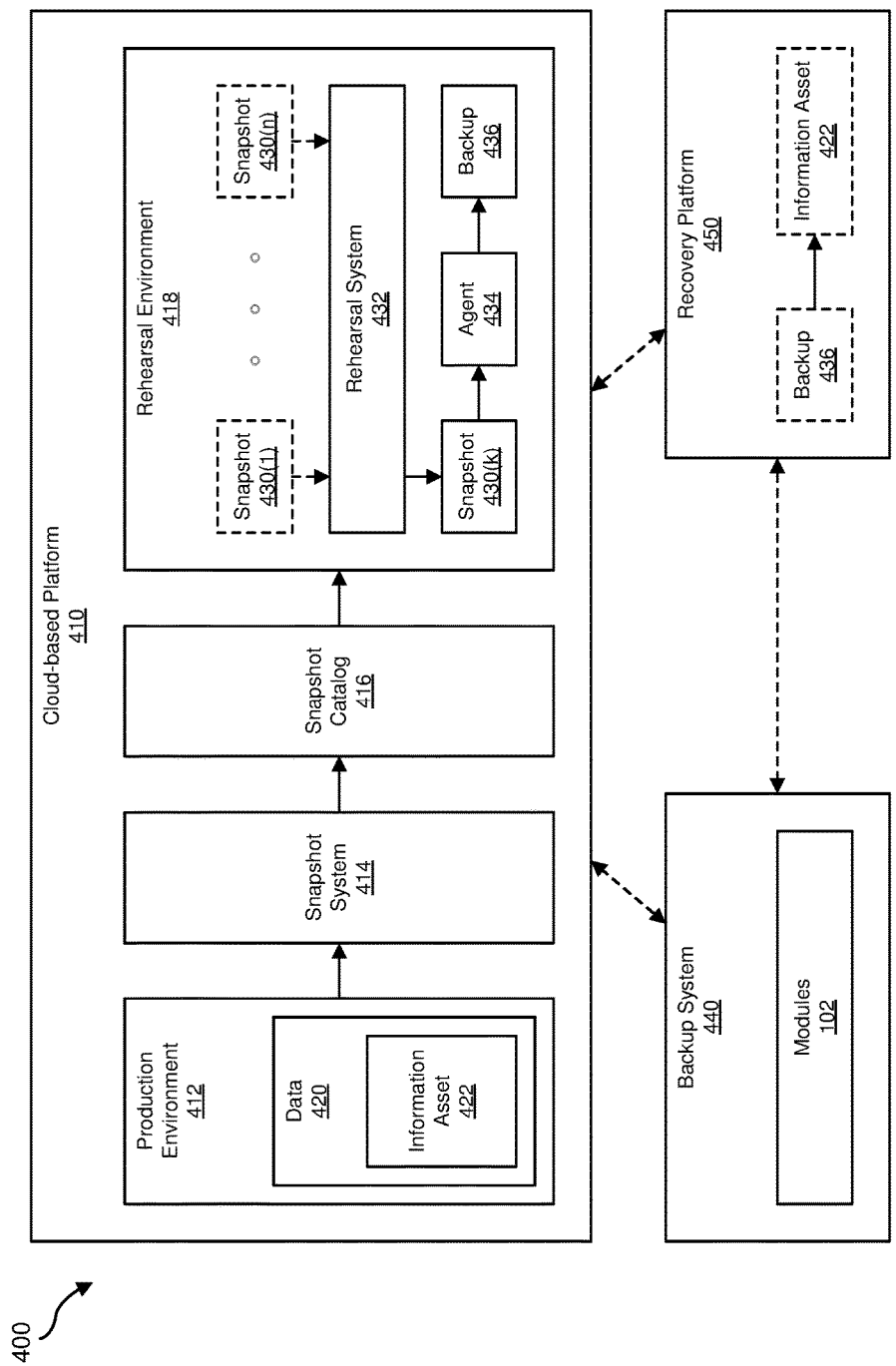
FIG. 4 is a block diagram of an example computing system for data protection using cloud-based snapshots.

The following will provide, with reference to FIGS. 1, 2, and 4, detailed descriptions of example systems for data protection using cloud-based snapshots. Detailed descriptions of corresponding computer-implemented methods will also be provided in connection with FIG. 3.

FIG. 1 is a block diagram of example system 100 for data protection using cloud-based snapshots. As illustrated in this figure, example system 100 may include one or more modules 102 for performing one or more tasks. For example, and as will be explained in greater detail below, example system 100 may include an identification module 104 that identifies a request to back up an information asset hosted by a cloud-based platform. Example system 100 may additionally include a discovery module 106 that discovers, in response to the request, a plurality of snapshots taken at the cloud-based platform, where at least some of the plurality of snapshots store data underlying the information asset but do not provide a consistent image of the information asset. Example system 100 may also include a determination module 108 that determines that a snapshot subset of the plurality of snapshots provides data sufficient to produce a consistent image of the information asset by attempting to recover a consistent image of the information asset from the snapshot subset within a rehearsal environment. Example system 100 may additionally include a performance module 110 that performs a backup that provides a consistent image of the information asset from the snapshot subset based on a successful attempt to recover the consistent image of the information asset from the snapshot subset within the rehearsal environment.

Performance module 110 may further perform a backup that provides a consistent image of the information asset from the snapshot subset based on a successful attempt to recover the consistent image of the information asset from the snapshot subset within the rehearsal environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or cloud-based platform 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate data protection using cloud-based snapshots.

Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as snapshots 150 and backup 160. Snapshots 150 generally represents any type or form of point-in-time representations of data. Backup 160 generally represents any type or form of data structure from which a previous version of data may be recovered.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a cloud-based platform 206 via a network 204. In one example, all or a portion of the functionality of modules 102 may be performed by computing device 202, cloud-based platform 206, and/or any other suitable computing system. As will be described in greater detail below, one or more of modules 102 from FIG. 1 may, when executed by at least one processor of computing device 202 and/or cloud-based platform 206, enable computing device 202 and/or cloud-based platform 206 to protect data using cloud-based snapshots.

Computing device 202 generally represents any type or form of computing device capable of reading computer-executable instructions. For example, computing device 202 may represent a data protection server. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Cloud computing platform 206 generally represents any type or form of computing device and/or collection of computing devices capable of reading computer-executable instructions. Examples of cloud computing platform 206 include, without limitation, application servers and database servers configured to provide various database services and/or run certain software applications. Although illustrated as a single entity in FIG. 2, cloud computing platform 206 may include and/or represent a plurality of servers that work and/or operate in conjunction with one another.

Network 204 generally represents any medium or architecture capable of facilitating communication or data transfer. In one example, network 204 may facilitate communication between computing device 202 and cloud-based platform 206. In this example, network 204 may facilitate communication or data transfer using wireless and/or wired connections. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system

200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for data protection using cloud-based snapshots. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a request to back up an information asset hosted by a cloud-based platform. For example, identification module 104 may, as part of computing device 202 in FIG. 2, identify request 210 to back up information asset 222 hosted by cloud-based platform 206.

The term "information asset," as used herein, may refer to any data collection and/or data processing system that may be subject to data protection. For example, the information asset may include an application. In some examples, the information asset may include data stored, managed, and/or accessed by the application. In some examples, the information asset may include state information describing a state of the application. In some examples, the information asset may include multiple applications. For example, the information asset may include multiple interoperating and/or interdependent applications. In some examples, the information asset may include a multi-tier application.

In some examples, the information asset may include a file system (including, e.g., one or more files stored within the file system and metadata describing and/or structuring the files). Additionally or alternatively, the information asset may include a virtual machine (including, e.g., one or more applications executing within the virtual machine and/or one or more data stores used, mounted, accessed, and/or managed by the virtual machine).

In some examples, the information asset may have characteristics that may make some snapshots of data underlying the information asset potentially unreliable sources for recovery of the information asset. For example, the information asset may perform and/or be subject to one or more types of transaction and/or operation that may not always be fully reflected in stored data underlying the information asset at any given moment. For example, the information asset may perform and/or be subject to transactions and/or operations that led to temporarily inconsistent states in stored data underlying the information asset. In some examples, state information for one or more transactions and/or operations may be stored in locations not captured by a snapshot (e.g., volatile memory, a temporary storage area, storage underlying a separate system with which the information asset is in communication, etc.). In some examples, stored data underlying the information asset may potentially be inconsistent when the information asset has not first been quiesced. Thus, in some examples, the information asset may sometimes be unquiesced (e.g., during ongoing operation within a production system) when a snapshot is taken.

As used herein, the phrase "cloud-based platform" may refer to any service, platform, and/or infrastructure that is capable of providing online and/or third-party hosting for applications and/or storage. Examples of cloud computing platforms include, without limitation, Platform-as-a-Service ("PaaS") systems, Software-as-a-Service ("SaaS") systems, and Infrastructure-as-a-Service ("IaaS") systems. In some examples, a cloud-based platform may provide third-party storage as well as the ability to launch computing instances that may access stored data. Examples of cloud computing services may include, without limitation, AMAZON WEB SERVICES ("AWS"), VMWARE VCLOUD, and OPENSTACK. In some examples, as will be explained in greater detail below, a cloud-based platform may take snapshots of data stored by the platform and/or for information assets hosted by the platform (e.g., to enable the recovery of data managed by the cloud-based platform to a previous point in time).

Identification module 104 may identify the request to back up the information asset in any of a variety of ways. For example, identification module 104 may receive a message from a data protection system identifying the information asset as a backup target. Additionally or alternatively, identification module 104 may operate as a part of a data protection system and receive a message and/or input identifying the information asset as a backup target. In some examples, the request may identify the information asset as such (e.g., the request may request an application-aware backup of an application, a file-system-aware backup of a file system, a virtual-machine-aware backup of a file system, etc.). In some examples, the request may include and/or relate to one or more specifications describing characteristics of a valid recovery of the information asset (e.g., the ability to interact with the information asset and/or to retrieve specified types of information from the information asset via specified operations).

Identification module 104 may identify the request to back up the information asset in any suitable context. For example, the request may represent an automated periodic evaluation of existing snapshots to ensure that sufficient snapshots exist to support recovery of the information asset (e.g., in order to ensure ongoing regulatory compliance and/or compliance with one or more service level objectives). In some examples, the request may originate from an administrator (e.g., to verify that the information asset will be recoverable). In some examples, the request to back up the information asset may specifically identify the information asset. Additionally or alternatively, the request to back up the information asset may include a request to back up one or more data objects that are accessed via the information asset. In this example, identification module 104 may impute the request to back up the data objects to a request to back up the information asset (e.g., since access to the information asset may enable access to the data objects).

The request to back up the information asset may include a request to any of a variety of ends. For example, the request to back up the information asset may include a request to initiate a backup procedure of the information asset (e.g., by creating a separate copy of data representing the information asset). Additionally or alternatively, the request to back up the information asset may include a request to identify one or more snapshots upon which to base a backup of the information asset. For example, the backup of the information asset may include one or more references to one or more portions of existing snapshots (e.g., rather than a separate copy of data derived from the snapshots). In some examples, the request to back up the information may represent an early step in an extended process. Accordingly, the request to back up the information may represent a request to identify one or more snapshots that may represent and/or support a backup of the information asset (without, e.g., immediately completing a backup process upon identifying the appropriate snapshots). In some examples, the request to back up the information may include and/or entail a request to free storage space (e.g., by identifying snapshots on the cloud-based platform that are superfluous and/or not useful for recovering the information asset).

FIG. 4 shows an example system 400 that may provide an example illustration of one or more of the steps discussed herein. As shown in FIG. 4, example system 400 may include a cloud-based platform 410, a backup system 440, and a recovery platform 450. Cloud-based platform 410 may host a production environment 412 which may use, handle, manage, and/or store data 420. Data 420 may underlie an information asset 422. In one example, at step 302, identification module 104 may, as a part of backup system 440, identify a request to back up information asset 422.

Returning to FIG. 3, at step 304, one or more of the systems described herein may discover, in response to the request, a plurality of snapshots taken at the cloud-based platform, where at least some of the plurality of snapshots store data underlying the information asset but do not provide a consistent image of the information asset. For example, discovery module 106 may, as part of computing device 202 in FIG. 2, discover, in response to request 210, snapshots 230 taken at the cloud-based platform, where at least some of snapshots 230 store data 220 underlying information asset 222 but do not provide a consistent image 242 of information asset 222.

The term "snapshot," as used herein, generally refers to any representation of a collection of data at a certain point in time. In some examples, the plurality of snapshots may preserve data in a raw and/or low-level format. For example, each snapshot may preserve data without awareness of particular information assets. In some examples, each snapshot may preserve data stored in non-volatile storage but not preserve data in volatile storage, in temporary storage, and/or in transitional storage. In some examples, each snapshot may preserve data within a defined scope (e.g., within a production environment) but may not preserve some data outside the defined scope that nevertheless may represent transactions and/or potential transactions with elements within the defined scope. In some examples, the plurality of snapshots may be taken by the cloud-based platform. For example, the cloud-based platform may take the snapshots as part of a secondary service provided by the cloud-based platform to protect primary and/or production data hosted by the cloud-based platform. Additionally or alternatively, the cloud-based platform may take the snapshots to improve storage reliability (e.g., through duplicate storage).

In some examples, the plurality of snapshots may preserve data in a storage arrangement specific to the cloud-based platform. For example, the plurality of snapshots may use a format that is readable by the cloud-based platform (but not, e.g., platforms of a different type and/or with a different configuration). In some examples, the plurality of snapshots may use a structure that reflects the structure of the cloud-based platform and that, therefore, assume the structure of the cloud-based platform for recovery purposes. At least partly for this reason, the plurality of snapshots may not be portable to other platforms (e.g., in a disaster recovery scenario).

As used herein, the term "consistent image," as it relates to an information asset, generally refers to any collection and/or arrangement of data that reflects an accurate, valid, and/or useable state of the information asset at a point in time. For example, a consistent image of an information asset may include a data view from which the information asset could successfully be recovered. In some examples, a consistent image of an information asset may include a state equivalent (or approximately equivalent) to a quiesced (and/or quiescible) state of the information asset.

In some examples, at least some of the plurality of snapshots may store data underlying the information asset but may not provide a consistent image of the information asset at least in part because the plurality of snapshots may store data according to a view from a different level of a technology stack than a view from a level of the technology stack used by the information asset. For example, the plurality of snapshots may capture a low-level representation of data at a point in time (e.g., data as currently physically stored) rather than a higher-level representation of data at the point in time (e.g., a logical representation of data assumed by an information asset, such as a file system and/or application, but which has not been fully and consistently committed to low-level storage and/or which is not certain to be entirely represented within the low-level storage).

Discovery module 106 may discover the plurality of snapshots in any suitable manner. In some examples, discovery module 106 may identify the information asset and/or one or more data objects that include and/or are included by the information asset and query the cloud-based platform with the identified items and receive a list of snapshots that include and/or cover the identified items. Additionally or alternatively, discovery module 106 may discover the plurality of snapshots by querying the cloud-based platform for snapshots taken within a specified time period and/or for snapshots that target data pertaining to an owner, manager, and/or administrator of the information asset.

Using FIG. 4 as an example of step 304, a snapshot system 414 may periodically take snapshots of production environment 412 (and, therefore, of data 420 underlying information asset 422). Snapshot system 414 may store and/or index snapshots in a snapshot catalog 416. In one example, at step 304, discovery module 106 may (e.g., via a query directed to snapshot system 414 and/or snapshot catalog 416) discover snapshots 430(1)-(n) as potentially pertaining to information asset 422.

Returning to FIG. 3, at step 306, one or more of the systems described herein may determine that a snapshot subset of the plurality of snapshots provides data sufficient to produce a consistent image of the information asset by attempting to recover a consistent image of the information asset from the snapshot subset within a rehearsal environment. For example, determination module 108 may, as part of computing device 202 in FIG. 2, determine that snapshot subset 232 of snapshots 230 provides data 220 sufficient to produce consistent image 242 of information asset 222 by attempting to recover consistent image 242 of information asset 222 from snapshot subset 232 within rehearsal environment 240.

As used herein, the term "environment" as it relates to computing may refer to any collection of computing resources and/or delineation of computing resources. Thus, information assets within a common environment may share resources, system configurations, and system states. Information assets within one environment may, in some cases, communicate with entities within another environment, albeit potentially with more intervening hops and/or layers of abstraction. In some examples, an environment may include a separate network and/or subnet. As used herein, the term "production environment" may refer to an environment within which one or more primary applications execute (e.g., to provide one or more services to end users). In some examples, one or more secondary applications (e.g., applications that provide services in support of primary applications) may be excluded from the production environment (e.g., to improve the performance of primary applications within the production environment and/or to avoid the administrative burden of maintaining secondary applications within the production environment). As used herein, the term "rehearsal environment," may refer to any environment in which attempts to recover an information asset may be conducted. In some examples, the rehearsal environment may separate and/or isolated from the production environment in which the information asset may be used. For example, operations within the rehearsal environment, attempts to recover an instance of the information asset within the rehearsal environment, and/or interactions with an instance of the information asset within the rehearsal environment may have minimal or no impact on the information asset within the production environment and/or operations within the production environment. For example, activities conducted by the systems described herein within the rehearsal environment may avoid negative impacts on the performance of information assets within the production environment and/or may avoid altering the state of information assets within the production environment.

As mentioned earlier, in some examples the plurality of snapshots may preserve data in a storage arrangement specific to the cloud-based platform. Accordingly, the rehearsal environment may use the storage arrangement specific to the cloud-based platform. For example, the rehearsal environment may be natively suited to read and/or load a format of the snapshots. In some examples, the plurality of snapshots may store data in a structure that reflects the structure of the rehearsal environment and/or a platform underlying the rehearsal environment (e.g., the cloud-based platform). Thus, the structure of the rehearsal environment may enable recovery operations from the snapshots to the rehearsal environment. For example, as will be explained in greater detail below, in some examples the rehearsal environment may be provisioned within the cloud-based platform (because, e.g., recovery operations from the snapshots within the cloud-based platform may be more practical than recovery operations from the snapshots on a different platform would be).

Determination module 108 may determine that the snapshot subset provides data sufficient to produce a consistent image of the information asset in any suitable manner. For example, determination module 108 may attempt to recover a consistent image of the information asset from the snapshot subset within a rehearsal environment. Determination module 108 may then determine that the attempt was successful and that, therefore, the snapshot subset provides data sufficient to produce a consistent image of the information asset. For example, determination module 108 may attempt to interact with the information asset. In some examples, determination module 108 may attempt to perform a query on the information asset to retrieve data from the information asset. Using a specific example, the information asset may include a database system including database records. In this example, determination module 108 may attempt to recover a consistent image of the database system from the snapshot subset within the rehearsal environment and then verify that the attempt was successfully by successfully querying the database system and retrieving stored records.

Determination module 108 may identify the snapshot subset in any suitable manner. For example, determination module 108 may iteratively attempt to recover a consistent image of the information asset from each snapshot within the plurality of snapshots until determination module 108 encounters one or more snapshots sufficient to recover a consistent image. In some examples, determination module 108 may determine that a snapshot is sufficient to recover a consistent image by recovering the snapshot and determining that the information asset is in a consistent state. In some examples, determination module 108 may determine that a snapshot is sufficient to recover a consistent image by recovering the snapshot and determining that the information asset can be repaired to a consistent state (e.g., through scripted recovery processes specific to the information asset applied by determination module 108, through a self-repair process performed by the information asset, and/or by ignoring non-fatal faults produced by minor inconsistencies until the information asset fully recovers).

The snapshot subset may have any number of snapshots. For example, the snapshot subset may include a single snapshot or may include several snapshots.

In some examples, the information asset may include multiple components. For example, the information asset may include multiple interoperating and/or interdependent applications. Accordingly, a failure to recover one application may entail a failure to recover the information asset. In some examples, determination module 108 may determine that one component of the information asset can be recovered from one snapshot but that other components of the information asset are not recoverable from the snapshot (e.g., because the snapshots cover different targets and/or because a snapshot that is consistent for one component may not be consistent for another component). In these examples, determination module 108 may identify one or more alternative snapshots from which the remaining components of the information assets are recoverable. In some examples, determination module 108 may recover two components of the information asset that are independent from each other from separate snapshots, but two components from the same snapshot when one is dependent on the other. As a specific example, the information asset may include a patient records system. The patient records system may include a file system storing millions of files, a database that is dependent on the file system, and a third-party application that provides an interface to the database. In this example, determination module 108 may identify a subset of snapshots from which each component (the file system, the database, and the third-party application) can be recovered to a consistent state such that the third-party application can successfully receive a patient records query and forward the query to the database, which can successfully retrieve the data needed to fill the query from the file system.

In some examples, one or more of the systems described herein may prepare the rehearsal environment. For example, determination module 108 may provision the rehearsal environment within the cloud-based platform to be isolated from a production environment within the cloud-based platform in which the information asset is in use. For example, determination module 108 may allocate, within the cloud-based environment, resources separate from the production environment. In some examples, determination module 108 may deploy an agent to the rehearsal environment to perform the backup of the information asset from within the rehearsal environment. In this manner, determination module 108 may perform the backup without injecting an agent into the production environment (where, e.g., the agent could perform expensive operations to protect the information asset that could negatively impact the performance of the production environment and/or which could inadvertently interfere with operations within the production environment).

Using FIG. 4 as an example, a rehearsal system 432 within rehearsal environment 418 may iteratively attempt to recover information asset 422 from snapshots 430(1)-(n). Rehearsal system 432 may successfully recover information asset 422 from snapshot 430(k) (and then, in some examples, suspend further attempts to recover information asset 422 from snapshots 430(k+1)-(n)). An agent 434 may then produce a backup 436 based on snapshot 430(k) (e.g., based on snapshot 430(k) having been proven by rehearsal system 432). In some examples, backup system 440 may have provisioned rehearsal environment 418 on cloud-based platform 410 and/or may have deployed agent 434 to rehearsal environment 418.

Returning to FIG. 3, at step 308, one or more of the systems described herein may perform a backup that provides a consistent image of the information asset from the snapshot subset based on a successful attempt to recover the consistent image of the information asset from the snapshot subset within the rehearsal environment. For example, performance module 110 may, as part of computing device 202 in FIG. 2, perform backup 250 that provides consistent image 242 of information asset 222 from snapshot subset 232 based on a successful attempt to recover consistent image 242 of information asset 222 from snapshot subset 232 within rehearsal environment 240.

As used herein, the term "backup" as it relates to an information asset may refer to any collection of data from which the information asset may be recovered (e.g., should a primary and/or live instance of the information asset become lost, corrupted, and/or unavailable). In some examples, the backup may include an asset-aware backup (e.g., a backup that preserves data in a structure informed by the operation of the asset and/or a view used by the asset and/or used to interact with the asset). For example, where the information asset includes an application, the backup may include an application-aware backup. In some examples, an asset-aware backup may be portable (e.g., because rather than structuring the backup according to a low-level representation of the underlying data as it is stored on a particular platform, the backup may be structured according to the operational logic of the asset and, therefore, may be portable to other platforms with which the asset is compatible). In some examples, the backup may include a reference to the snapshot subset (e.g., identifying the snapshot subset as protecting the information asset and/or referencing data within the snapshot subset).

Performance module 110 may perform the backup in any of a variety of ways. For example, performance module 110 may copy the information asset from the snapshot subset upon recovering the information asset using the snapshot subset. In some examples, performance module 110 may construct the backup as a collection of references to locations within the snapshot subset (e.g., such that the backup data remains within the snapshot subset and the backup exists as a logical description and/or arrangement of the relevant data within the snapshot subset). In some examples, performance module 110 may perform the backup simply by identifying the snapshot subset as to be preserved as a backup of the information asset.

In some examples, performance module 110 may recover data the snapshot subset and determine that the information asset is in an inconsistent but recoverable state. Accordingly, performance module 110 may quiesce the information asset and/or repair the information asset (e.g., through scripted recovery processes specific to the information asset applied by performance module 110, through initiating a self-repair process performed by the information asset, and/or by ignoring non-fatal faults produced by minor inconsistencies until the information asset fully recovers).

In some examples, one or more systems described herein may delete snapshots from the plurality of snapshots that are superfluous. For example, in some examples, systems described herein may determine that a candidate snapshot within the plurality of snapshots does not provide data sufficient to produce a consistent image of the information asset. Accordingly, these systems may delete the candidate snapshot at least in part in response to determining that the candidate snapshot does not provide data sufficient to produce a consistent image of the information asset. In this manner, the systems described herein may free storage space for future snapshots (e.g., to enable the protection of additional information assets and/or of the information asset at future points in time) and/or for other purposes.

In one example, systems described herein may delete at least one snapshot within the plurality of snapshots but outside the snapshot subset based at least in part on determining that the snapshot subset provides data sufficient to produce a consistent image of the information asset.

In some examples, one or more of the systems described herein may recover the information asset from the backup (e.g., when a fault affecting the instance of the information backup on the production system occurs). For example, systems described herein may identify a loss of availability of the information asset due to a failure at the cloud-based platform and may recover the information asset onto a different platform from the backup in response to identifying the loss of availability of the information asset due to the failure at the cloud-based platform. In some examples, the different platform may be of a different type than the cloud-based platform and/or may be configured differently than the cloud-based platform. Accordingly, in one example, the subset of snapshots may be of a format consumable by the cloud-based platform but not by the different platform. However, the backup may be of a format consumable by the different platform. Thus, the systems described herein may transform snapshots that are not portable and whose high-level recoverability are uncertain into backups that are portable and whose asset-level consistency has been verified.

As explained above in connection with the description of FIG. 3, the systems and methods described herein may deploy a backup management process within an IaaS system alongside the workloads that the backup management process is intended to protect. The IaaS provider may continue to initiate periodic snapshots, both for recovery and for improving the durability of the underlying storage. Based on a backup or data protection policy, the backup management process may query the IaaS provider for snapshots of specific objects as defined by a user. The backup management system may provision an isolated environment in which it can safely recover the snapshot without interfering with the production system. Once online, the backup management service may push a backup agent to the host which may perform the following steps: (i) interrogate the virtual machine, application, or other information asset that it is intended to protect to confirm that the recovery from snapshot was successful, (ii) quiesce the information asset to a consistent state and backup the information asset, and (iii) delete unneeded snapshots according to retention policies defined by the user. If the information asset is unable to recover successfully from the snapshot, the backup management service may delete the snapshot and try the next snapshot in order to fulfill the data protection service level agreement defined in the data protection policy.

In some examples, these systems and methods may use the IaaS provider to dynamically provision an alternate service for backing up the information asset, in a network-isolated fashion, to protect the quality of service provided by the production instance. In addition, these systems and methods may create a confirmed backup image from a crash consistent snapshot, which may be used for regulatory compliance and further data lifecycle processing such as provisioning test and development environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for data protection using cloud-based snapshots, at least a portion of the method being performed by a computing device comprising at least one processor, the method comprising:
    identifying a request to back up an information asset hosted by a cloud-based platform;
    discovering, in response to the request, a plurality of snapshots taken at the cloud-based platform, wherein at least some of the plurality of snapshots store data underlying the information asset but do not provide a consistent image of the information asset;
    determining that a snapshot subset of the plurality of snapshots provides data sufficient to produce the consistent image of the information asset by iteratively attempting to recover, within a rehearsal environment, the consistent image of the information asset from each snapshot within the plurality of snapshots until encountering at least one snapshot that is sufficient to recover the consistent image;
    performing a backup that provides the consistent image of the information asset from the snapshot subset based on a successful attempt to recover the consistent image of the information asset from the snapshot subset within the rehearsal environment.

2. The computer-implemented method of claim 1, wherein the plurality of snapshots preserve data in a storage arrangement specific to the cloud-based platform.

3. The computer-implemented method of claim 2, wherein the rehearsal environment uses the storage arrangement specific to the cloud-based platform.

4. The computer-implemented method of claim 3, further comprising:
    provisioning the rehearsal environment within the cloud-based platform to be isolated from a production environment within the cloud-based platform in which the information asset is in use;
    deploying an agent to the rehearsal environment to perform the backup of the information asset from within the rehearsal environment.

5. The computer-implemented method of claim 1, wherein at least some of the plurality of snapshots store data underlying the information asset but do not provide the consistent image of the information asset at least in part because the plurality of snapshots store data according to a view from a different level of a technology stack than a view from a level of the technology stack used by the information asset.

6. The computer-implemented method of claim 1, further comprising:
    determining that a candidate snapshot within the plurality of snapshots does not provide data sufficient to produce the consistent image of the information asset;
    deleting the candidate snapshot at least in part in response to determining that the candidate snapshot does not provide data sufficient to produce the consistent image of the information asset.

7. The computer-implemented method of claim 1, further comprising:
    deleting at least one snapshot within the plurality of snapshots but outside the snapshot subset based at least in part on determining that the snapshot subset provides data sufficient to produce the consistent image of the information asset.

8. The computer-implemented method of claim 1, wherein the information asset comprises an application.

9. The computer-implemented method of claim 1, wherein the information asset comprises at least one of:
    a file system;
    a virtual machine.

10. The computer-implemented method of claim 1, further comprising:
    identifying a loss of availability of the information asset due to a failure at the cloud-based platform;
    recovering the information asset onto a different platform from the backup in response to identifying the loss of availability of the information asset due to the failure at the cloud-based platform.

11. The computer-implemented method of claim 10, wherein:
    the snapshot subset of the plurality of snapshots is of a format consumable by the cloud-based platform but not by the different platform;
    the backup is of a format consumable by the different platform.

12. A system for data protection using cloud-based snapshots, the system comprising:
    an identification module, stored in memory, that identifies a request to back up an information asset hosted by a cloud-based platform;
    a discovery module, stored in memory, that discovers, in response to the request, a plurality of snapshots taken at the cloud-based platform, wherein at least some of the plurality of snapshots store data underlying the information asset but do not provide a consistent image of the information asset;
    a determination module, stored in memory, that determines that a snapshot subset of the plurality of snapshots provides data sufficient to produce the consistent image of the information asset by iteratively attempting to recover, within a rehearsal environment, the consistent image of the information asset from the each snapshot within the plurality of snapshots until encountering at least one snapshot that is sufficient to recover the consistent image;
    a performance module, stored in memory, that performs a backup that provides the consistent image of the information asset from the snapshot subset based on a successful attempt to recover the consistent image of the information asset from the snapshot subset within the rehearsal environment; and
    at least one physical processor configured to execute the identification module, the discovery module, the determination module, and the performance module.

13. The system of claim 12, wherein the plurality of snapshots preserve data in a storage arrangement specific to the cloud-based platform.

14. The system of claim 13, wherein the rehearsal environment uses the storage arrangement specific to the cloud-based platform.

15. The system of claim 14, wherein the determination module further:
    provisions the rehearsal environment within the cloud-based platform to be isolated from a production environment within the cloud-based platform in which the information asset is in use;

deploys an agent to the rehearsal environment to perform the backup of the information asset from within the rehearsal environment.

16. The system of claim 12, wherein at least some of the plurality of snapshots store data underlying the information asset but do not provide the consistent image of the information asset at least in part because the plurality of snapshots store data according to a view from a different level of a technology stack than a view from a level of the technology stack used by the information asset.

17. The system of claim 12, wherein the determination module further:
- determines that a candidate snapshot within the plurality of snapshots does not provide data sufficient to produce the consistent image of the information asset;
- deletes the candidate snapshot at least in part in response to determining that the candidate snapshot does not provide data sufficient to produce the consistent image of the information asset.

18. The system of claim 12, wherein the determination module further deletes at least one snapshot within the plurality of snapshots but outside the snapshot subset based at least in part on determining that the snapshot subset provides data sufficient to produce the consistent image of the information asset.

19. The system of claim 12, wherein the information asset comprises an application.

20. A non-transitory computer-readable medium comprising one or more computer-readable instructions that, when executed by at least one processor of a computing device, cause the computing device to:
- identify a request to back up an information asset hosted by a cloud-based platform;
- discover, in response to the request, a plurality of snapshots taken at the cloud-based platform, wherein at least some of the plurality of snapshots store data underlying the information asset but do not provide a consistent image of the information asset;
- determine that a snapshot subset of the plurality of snapshots provides data sufficient to produce the consistent image of the information asset by iteratively attempting to recover, within a rehearsal environment, the consistent image of the information asset from each snapshot within the plurality of snapshots until encountering at least one snapshot that is sufficient to recover the consistent image;
- perform a backup that provides the consistent image of the information asset from the snapshot subset based on a successful attempt to recover the consistent image of the information asset from the snapshot subset within the rehearsal environment.

\* \* \* \* \*

UNITED STATES PATENT AND TRADEMARK OFFICE
CERTIFICATE OF CORRECTION

PATENT NO. : 10,216,583 B1
APPLICATION NO. : 15/367217
DATED : February 26, 2019
INVENTOR(S) : Thomas Krinke Page 1 of 1

It is certified that error appears in the above-identified patent and that said Letters Patent is hereby corrected as shown below:

In the Claims

In Column 18, Line 43, Claim 12, delete "the each" and insert -- each --, therefor.

Signed and Sealed this
Thirtieth Day of April, 2019

Andrei Iancu
*Director of the United States Patent and Trademark Office*